Jan. 14, 1958 E. G. FUBINI 2,820,175

ELECTROMAGNETIC DEFLECTION SYSTEM

Filed Aug. 18, 1955

INVENTOR
Eugene G. Fubini
BY George Sipkin
Leo J. Hutzberger
ATTORNEY

United States Patent Office 2,820,175

Patented Jan. 14, 1958

2,820,175

ELECTROMAGNETIC DEFLECTION SYSTEM

Eugene G. Fubini, Glen Head, N. Y., assignor, by mesne assignments, to the United States of America as represented by the Secretary of the Navy Application August 18, 1955, Serial No. 529,367

8 Claims. (Cl. 315—27)

This invention relates to an electromagnetic deflection system for a cathode ray tube and, more particularly, to such an electromagnetic deflection system employing a distributed line amplifier.

The need arises in certain applications, such as computers, etc., to deflect the electron beam of a cathode ray tube between two or more positions in a very short time, i. e., in the order of a few microseconds. Conventional electromagnetic deflection systems are incapable of responding to these high frequencies due to the inherent time lag produced by the inductance of the deflecting yoke. Thus, the deflection of the electron beam of a cathode ray tube will not faithfully follow an applied deflection signal having high frequency components.

It is an object of this invention to provide an electromagnetic deflection system for a cathode ray tube which is capable of following an input signal having high frequency components.

It is a more specific object of this invention to provide a deflection system for a cathode ray tube employing a yoke composed of a plurality of individual series-connected coils which are coupled as an output transmission line for a distributed line amplifier which has a high frequency deflection signal applied as an input thereto.

Figure 1:
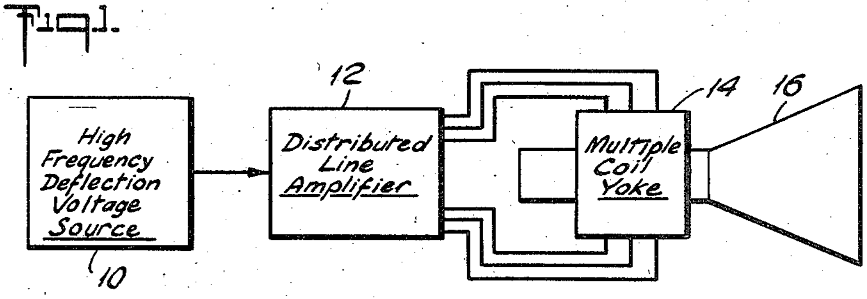
Figure 2:
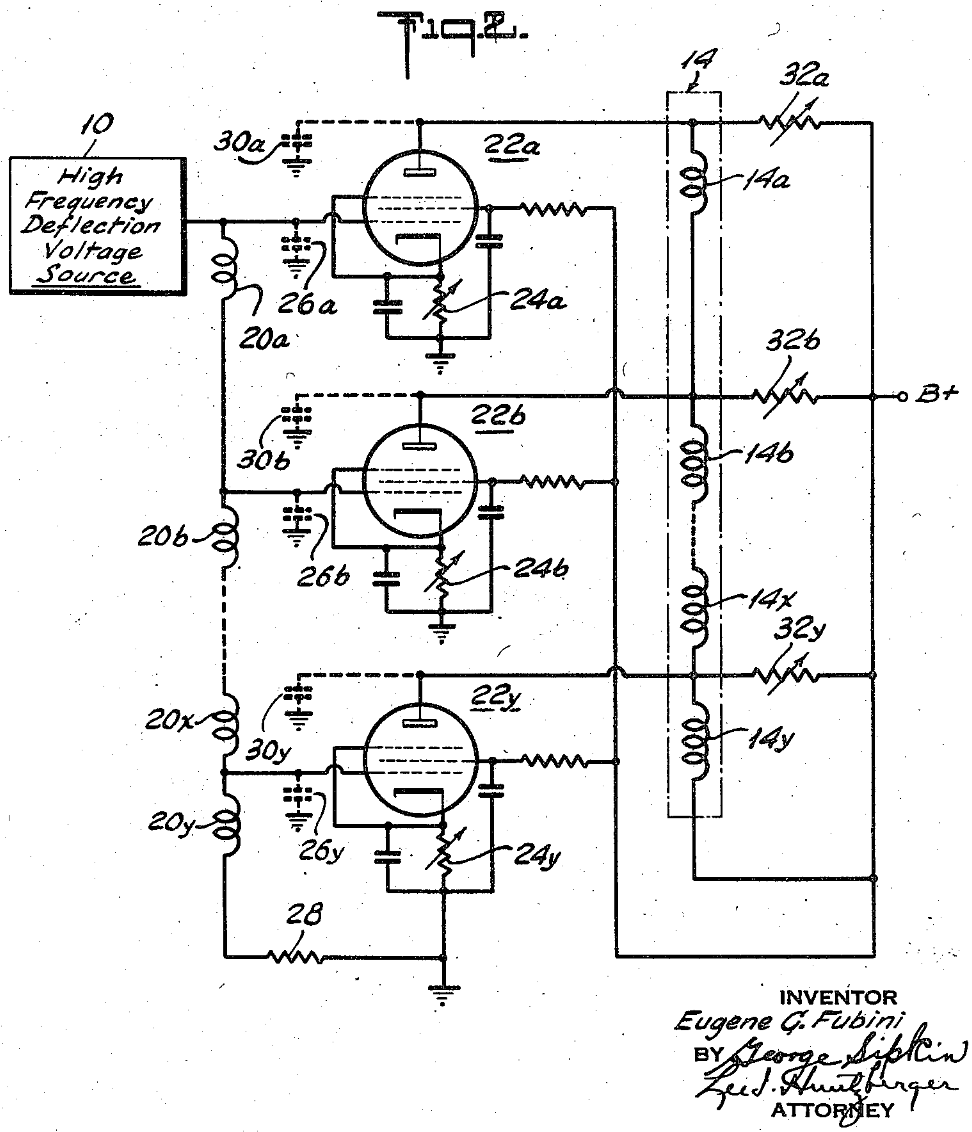

Other objects and many of the attendant advantages of this invention will be readily appreciated as the same becomes better understood by reference to the following detailed description when considered in connection with the accompanying drawings wherein:

Fig. 1 is a block diagram of an electromagnetic deflection system for a cathode ray tube employing the principles of this invention, and Fig. 2 is a block and schematic diagram of a preferred embodiment of this invention.

Referring now to Fig. 1, the output of high frequency deflection voltage source 10 is applied as an input to distributed line amplifier 12. Multiple coil yoke 14 consists of a plurality of individual series-connected coils which are spatially arranged in a conventional manner about the neck of cathode ray tube 16 to provide a magnetic field, which when energized, deflects the electron beam of cathode ray tube 16. The series-connected coils of yoke 14 are coupled as an output transmission line for distributed line amplifier 12.

It is well known that distributed line amplifiers have excellent high frequency response. Therefore, the insertion of distributed line amplifier 12 between high frequency deflection voltage source 10 and multiple coil yoke 14 produces a current in multiple coil yoke 14, providing a magnetic field which is proportional thereto, and hence a deflection of the electron beam of cathode ray tube which faithfully follow the waveform of the output of high frequency deflection voltage source 10.

Referring now to Fig. 2, wherein corresponding elements in Fig. 1 and Fig. 2 are identified by identical reference numerals, there is shown in detail the first two stages and the last stage of distributed line amplifier 12. Additional similar stages, not shown, may be employed. The larger the number of total stages employed, the closer the characteristics of distributed line amplifier 12 will be to the characteristics which would be obtained with an actual distributed line having an infinite number of stages, each stage covering only an infinitesimal portion of the line. However, in practice, four to eight stages are sufficient to obtain, with very close approximation, the characteristics of an actual distributed line.

The output of high frequency deflection voltage source 10 is applied as an input to tapped delay line 18 which includes a plurality of individual series-connected coils, 20*a* 20*b* . . . 20*x* and 20*y*. Coils 20*a* through 20*y* may be contained in a yoke similar to yoke 14.

The output of high frequency deflection voltage source 10 is applied directly as an input to the control electrode of conventional pentode amplifier 22*a* which is biased by cathode resistance 24*a* to operate as a constant current class A amplifier. The potential appearing at the junction of coils 20*a* and 20*b* is applied as an input to pentode amplifier 22*b* which includes variable cathode bias resistance 24*b*. The voltage appearing the junction of coils 20*x* and 20*y* is applied as an input to pentode amplifier 22*y* which includes variable cathode bias resistance 24*y*. The voltage appearing at each of the junctions of the intervening coils, not shown, are applied as an input to other pentode amplifiers, not shown. Pentode amplifiers 22*b*, 22*y* and the intervening pentode amplifiers are similar to pentode amplifier 22*a*.

Each of the shunt capcitances 26*a*, 26*b* . . . 26*y*, of delay line 18 consists of distributed capacitance and the interelectrode capacitance of the amplifier with which that capacitance is associated. Input delay line 18 is terminated in its characteristic impedance by resistance 28.

Yoke 14 is composed of series-connected coils 14*a*, 14*b* . . . 14*x* and 14*y*. Series-connected coils 14*a* through 14*y* are connected as an output transmission line for amplifiers 22*a* through 22*y*, respectively, the output of each amplifier being connected to a point on this output transmission line which corresponds to the point on input delay line 18 to which the input of that amplifier is connected.

As shown, one end of coil 14*y* is connected directly to a point of fixed positive potential. However, a terminating resistance may be inserted between this one end of coil 14*y* and the point of fixed positive potential to ensure suppression of reflections. The anode of pentode amplifier 22*a* is connected directly to one end of coil 14*a*, the anode of pentode amplifier 22*b* is connected to the junction of coils 14*a* and 14*b* and the anode of pentode amplifier 22*y* is connected to the junction of coils 14*x* and 14*y*. In a similar manner the anodes of the intervening pentode amplifiers are connected to the respective junctions of the intervening coils of yoke 14.

The anode of pentode amplifier 22*a* is also connected to the point of fixed positive potential through variable resistance 32*a*, and in a like manner the anodes of pentode amplifiers 22*b* through 22*y* are connected to the point of fixed positive potential through variable resistances 32*b* through 32*y*, respectively. The magnitude of each of resistances 32*a* through 32*y* is high relative to the impedance of each of the coils of yoke 14.

Each of the shunt capacitances, 30*a*, 30*b* . . . 30*y*, of the output transmission line formed by yoke 14 is composed of distributed capacitance and the interelectrode capacitance of the pentode amplifier with which that capacitance is associated. The delay provided by each of the series-connected coils of yoke 14 is made equal to the corresponding section of input delay line 18. In order to accomplish this, it may be necessary to augment shunt capacitances 26a through 26y or shunt capacitances 30a through 30y with trimmer capacitances.

Referring now to the operation of the deflection system shown in Fig. 2, the output from high frequency deflection voltage source 10 in traveling down delay line 18 applies successively the same signal to the respective inputs of pentode amplifiers 22a, 22b . . . 22y. The application of this signal to each of the inputs of the pentode amplifiers produces a corresponding output current which is applied to the coils of yoke 14 at the point thereon to which the anode of that amplifier is connected. Since the delays provided by each section of input delay line 18 and the output transmission line formed by yoke 14 are identical, the output current from pentode amplifier 22a will reach the junction of coils 14a and 14b in phase with the current applied to the junction of coils 14a and 14b from pentode amplifier 22b. In a like manner the contribution of the currents from all the pentode amplifiers will be applied in phase. The deleterious effect of reflections in the output transmission line, formed by yoke 14, is minimized by the damping provided by the inherent resistance of coils 14a through 14y. Reflections may be further reduced by terminating the output of the transmission line formed by yoke 14 in a resistance having a magnitude equal to the characteristic impedance of the output transmission line. However, inserting such a terminating resistance, rather than connecting the end of coil 14y directly to the point of fixed positive potential, as shown, will reduce the amplitude of the current flowing through the series connected coils of yoke 14, thus reducing the intensity of the magnetic field produced thereby.

By suitably adjusting resistances 24a through 24y as well as resistances 32a through 32y, the pentode amplifiers may be differentially biased to provide identical direct currents in each coil of yoke 14.

Obviously many modifications and variations of the present invention are possible in the light of the above teachings. It is therefore to be understood that within the scope of the appended claims the invention may be practiced otherwise than as specifically described.

I claim:

1. In combination, a deflection voltage source, a distributed line amplifier, a yoke including a plurality of individual coils connected in series with each other, said yoke providing when energized a magnetic field which is adapted to deflect the electron beam of a cathode ray tube, first means coupling said deflection voltage source to said distributed line amplifier for applying the output of said deflection voltage source as an input to said distributed line amplifier, and second means coupling the coils of said yoke to said distributed line amplifier as an output transmission line for said distributed line amplifier, whereby said yoke is energized by the output of said distributed line amplifier.

2. The combination defined in claim 1, further comprising a cathode ray tube, said yoke being positioned relative to said cathode ray tube to deflect the electron beam of said cathode ray tube in response to said yoke being energized.

3. The combination defined in claim 1, wherein the output of said deflection voltage source includes a high frequency component.

4. The combination defined in claim 1, wherein said distributed line amplifier includes a plurality of constant-current amplifiers, an input delay line including a plurality of spaced taps along the length thereof equal in number to said plurality of constant-current amplifiers, and means for applying the potential appearing at each tap as an input to a separate one of said constant current amplifiers; wherein said first means comprises third means for applying the output of said deflection voltage source as an input to said delay line; and wherein said second means comprises fourth means for feeding the output current from each of said constant-current amplifiers to a separate point on the output transmission line formed by said series-connected coils of said yoke.

5. The combination defined in claim 4, wherein the time delay provided between successive points on said output transmission line is substantially equal to the time delay provided between corresponding successive taps on said input delay line.

6. The combination defined in claim 5, wherein each of said constant-current amplifiers comprises an electron discharge device having at least a cathode, an anode, a screen electrode and a control electrode, and means for biasing each of said discharge devices to operate as a class-A amplifier.

7. The combination defined in claim 6, wherein each of said coils has one end thereof connected directly to the anode of a separate discharge device, and means connecting the other end of the coil nearest the termination of said output transmission line to a point of fixed positive potential.

8. The combination defined in claim 7, wherein each of said constant-current amplifiers respectively further comprises a resistance having a magnitude which is high relative to the magnitude of the impedance of one of said coils, said resistance being connected directly between the anode of the discharge device of a respective constant-current amplifier and said point of fixed positive potential, and said discharge devices being differentially biased to provide a uniform direct current in all said coils.

References Cited in the file of this patent

UNITED STATES PATENTS

| | | |
|---|---|---|
| 2,204,055 | Skellett | June 11, 1940 |
| 2,299,571 | Dome | Oct. 20, 1942 |
| 2,369,631 | Zanarini | Feb. 13, 1945 |
| 2,444,651 | Jones et al. | July 6, 1948 |
| 2,513,260 | Alfven et al. | June 27, 1950 |
| 2,745,005 | Lynch et al. | May 8, 1956 |